United States Patent
Chaudhury et al.

(10) Patent No.: US 11,138,711 B2
(45) Date of Patent: Oct. 5, 2021

(54) DEGRADATION DETECTION DEVICE, DEGRADATION DETECTION METHOD, AND COMPUTER-READABLE RECORDING MEDIUM

(71) Applicant: NEC CORPORATION, Tokyo (JP)

(72) Inventors: Subhajit Chaudhury, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 183 days.

(21) Appl. No.: 16/322,616

(22) PCT Filed: Aug. 2, 2016

(86) PCT No.: PCT/JP2016/072700
§ 371 (c)(1),
(2) Date: Feb. 1, 2019

(87) PCT Pub. No.: WO2018/025336
PCT Pub. Date: Feb. 8, 2018

(65) Prior Publication Data
US 2020/0184622 A1 Jun. 11, 2020

(51) Int. Cl.
*G06T 7/00* (2017.01)
*G06T 7/11* (2017.01)
(Continued)

(52) U.S. Cl.
CPC ............. *G06T 7/0002* (2013.01); *G06T 7/11* (2017.01); *G06T 7/174* (2017.01); *G06T 7/248* (2017.01);
(Continued)

(58) Field of Classification Search
CPC . G06T 5/002; G06T 2207/20182; G06T 5/50; G06T 2207/20201; G06T 7/11; G06T 7/0002; G06T 7/174; G06T 7/248
See application file for complete search history.

(56) References Cited

U.S. PATENT DOCUMENTS

| 5,361,105 A * | 11/1994 | Iu ........................... H04N 5/145 348/699 |
| 2007/0139517 A1* | 6/2007 | Jenkins .................. H04N 7/141 348/14.09 |

(Continued)

FOREIGN PATENT DOCUMENTS

| JP | 02-198306 A | 8/1990 |
| JP | 2008-232998 A | 10/2008 |

(Continued)

OTHER PUBLICATIONS

Communication dated Feb. 18, 2020, issued by the Japan Patent Office in application No. 2018-531022.
(Continued)

*Primary Examiner* — Kenny A Cese
(74) *Attorney, Agent, or Firm* — Sughrue Mion, PLLC (57) ABSTRACT

A degradation detection device (10) includes: an image acquisition unit (11) that acquires an image sequence of a detection target; a matching point specification unit (12) that specifies matching points in the image sequence; a motion amount calculation unit (13) that, based on the specified matching points, for each frame that constitutes the image sequence, specifies motion occurring between the frame and a frame immediately previous thereto, and calculates a motion amount for each of the matching points along a time series; and a degraded region candidate specification unit (14) that specifies a region in which degradation has likely occurred in the image sequence, based on the motion amounts of the matching points that were calculated along the time series.

6 Claims, 10 Drawing Sheets

(51) Int. Cl.
*G06T 7/174* (2017.01)
*G06T 7/246* (2017.01)
*G06T 5/00* (2006.01)
*G06T 5/50* (2006.01)

(52) U.S. Cl.
CPC ............... *G06T 5/002* (2013.01); *G06T 5/50* (2013.01); *G06T 2207/10016* (2013.01); *G06T 2207/20021* (2013.01); *G06T 2207/20182* (2013.01)

(56) References Cited

U.S. PATENT DOCUMENTS

| | | | | |
|---|---|---|---|---|
| 2013/0034305 A1* | 2/2013 | Jahanshahi | ........... | G06T 7/0004 382/201 |
| 2014/0093139 A1* | 4/2014 | Yamagishi | ......... | H04N 1/00015 382/112 |
| 2017/0195591 A1* | 7/2017 | Avadhanam | ......... | H04B 1/3833 |

FOREIGN PATENT DOCUMENTS

| | | |
|---|---|---|
| JP | 2015-102363 A | 6/2015 |
| WO | 2015/159469 A1 | 10/2015 |
| WO | 2016/047093 A1 | 3/2016 |
| WO | 2016/142965 A1 | 9/2016 |

OTHER PUBLICATIONS

Han Hu et al., "HTF: A Novel Feature for General Crack Detection", Proceedings of 2010 IEEE 17th International Conference on Image Processing, ICIP 2010, Sep. 26-29, 2010, pp. 1633-1636.

Zhen Wang et al., "Crack-opening displacement estimation method based on sequence of motion vector field images for civil infrastructure deterioration inspection", Information and Media Processing Labs, NEC, IMPS 2014, I-1-17, 2 pages.

International Search Report for PCT/JP2016/072700, dated Oct. 18, 2016.

* cited by examiner

Slice of motion volume and proposed spatio-temporal filter at some time t

Fig.4

Comparison of proposed non-linearity with conventional dissimilarity metric

DEGRADATION DETECTION DEVICE, DEGRADATION DETECTION METHOD, AND COMPUTER-READABLE RECORDING MEDIUM

CROSS REFERENCE TO RELATED APPLICATIONS

This Application is a National Stage of International Application No. PCT/JP2016/072700 filed Aug. 2, 2016.

TECHNICAL FIELD

The present invention relates to a degradation detection device and a degradation detection method for detecting a degraded portion in a moving image of an infrastructure-related structure or the like, and furthermore relates to a computer-readable recording medium having recorded thereon a program for realizing the same.

BACKGROUND ART

Conventionally, degradation in infrastructure-related structures such as tunnels and bridges has been performed through visual inspection or hammering testing carried out by an inspector, and when performing such inspection, it is necessary to install scaffolding and prepare an environment that enables inspection to be performed. For this reason, there is a problem in that degradation detection has conventionally been costly. Also, depending on the situation, there are also problems in that traffic restrictions need to be implemented, and economic opportunities are lost.

Figure 8:
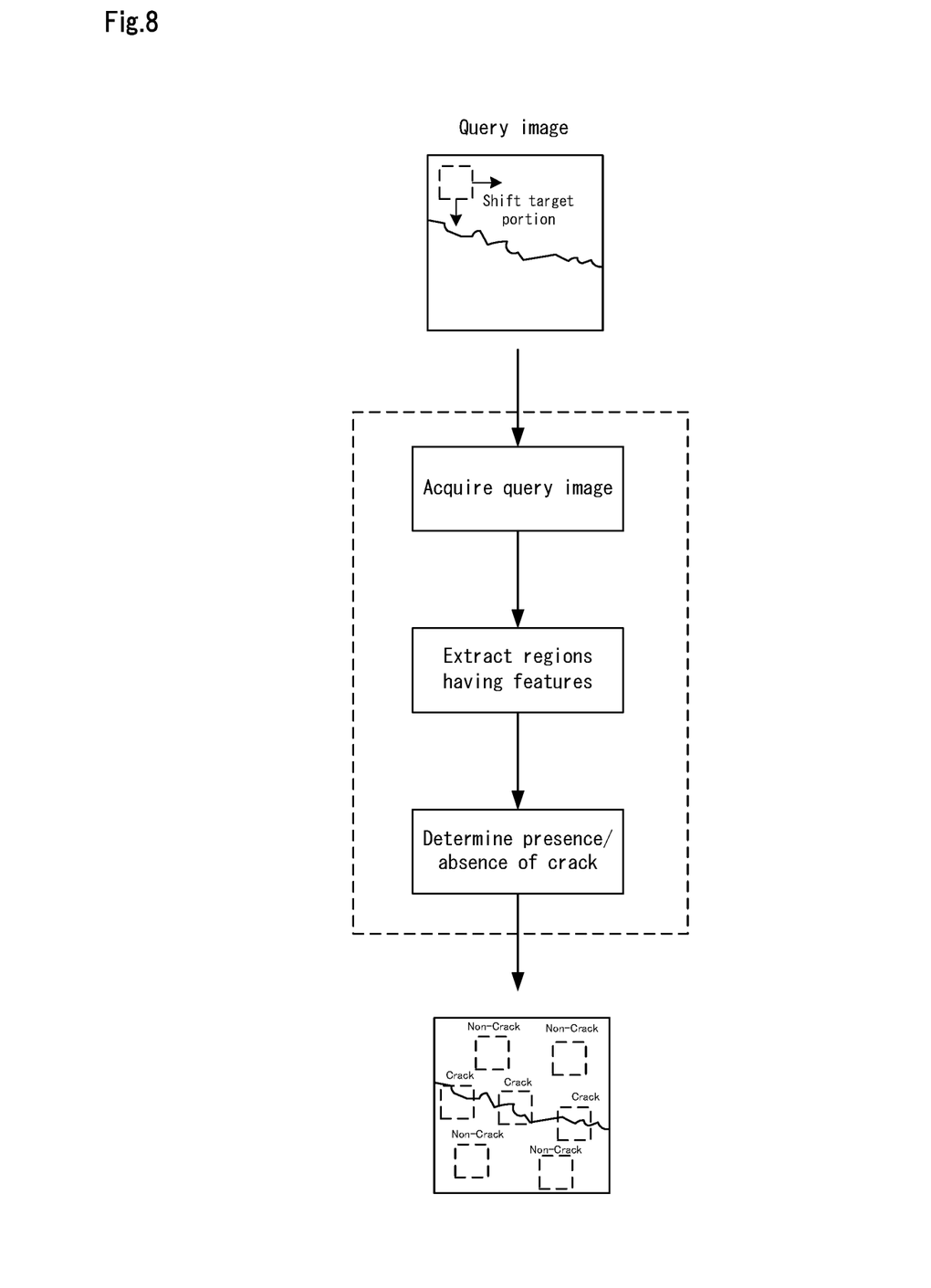
FIG. 8 is a diagram schematically showing processing in a system disclosed in Non-Patent Document 1.

For this reason, in recent years, degradation detection performed using a moving image has been proposed (e.g., Non-Patent Document 1, Non-Patent Document 2, and Patent Document 1). Specifically, Non-Patent Document 1 discloses a system that utilizes features in partial images that have been extracted manually, creates a learned model based on the features, and specifies cracks in images by classifying image regions into "Crack" and "Non-Crack" classes. FIG. 8 is a diagram that schematically shows processing in the system disclosed in Non-Patent Document 1.

As shown in FIG. 8, upon receiving a query image, the system disclosed in Non-Patent Document 1 uses the model to extract regions that have a pre-set feature while moving over portions of the query image. For each portion of the query image, the system determines whether a crack is present or absent, and combines portions so as to specify the locations of cracks in the query image.

Figure 9:
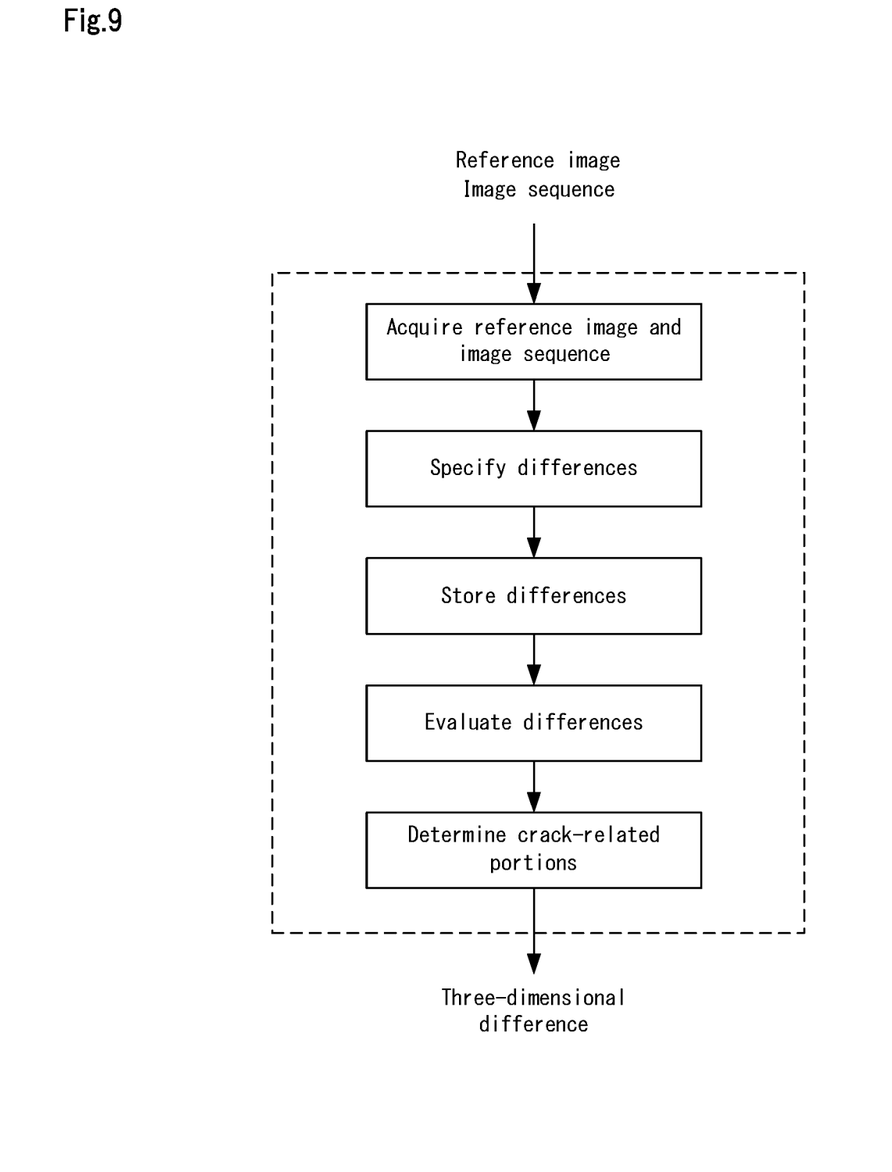
FIG. 9 is a diagram schematically showing processing in a system disclosed in Non-Patent Document 2.

Furthermore, Non-Patent Document 2 discloses a system for detecting cracks with use of a sequence of images. FIG. 9 is a diagram that schematically shows processing in the system disclosed in Non-Patent Document 2.

As shown in FIG. 9, the system disclosed in Non-Patent Document 2 acquires a reference image in which the position of a crack has been specified in advance, and an image sequence of a detection target. For each image that constitutes the image sequence, the system specifies differences from the reference image, and then stores the specified differences as a motion field. The system then uses the stored motion field to make an evaluation for each of the differences, and determines that the differences that have the highest reliability are crack-related portions (three-dimensional differences).

Figure 10:
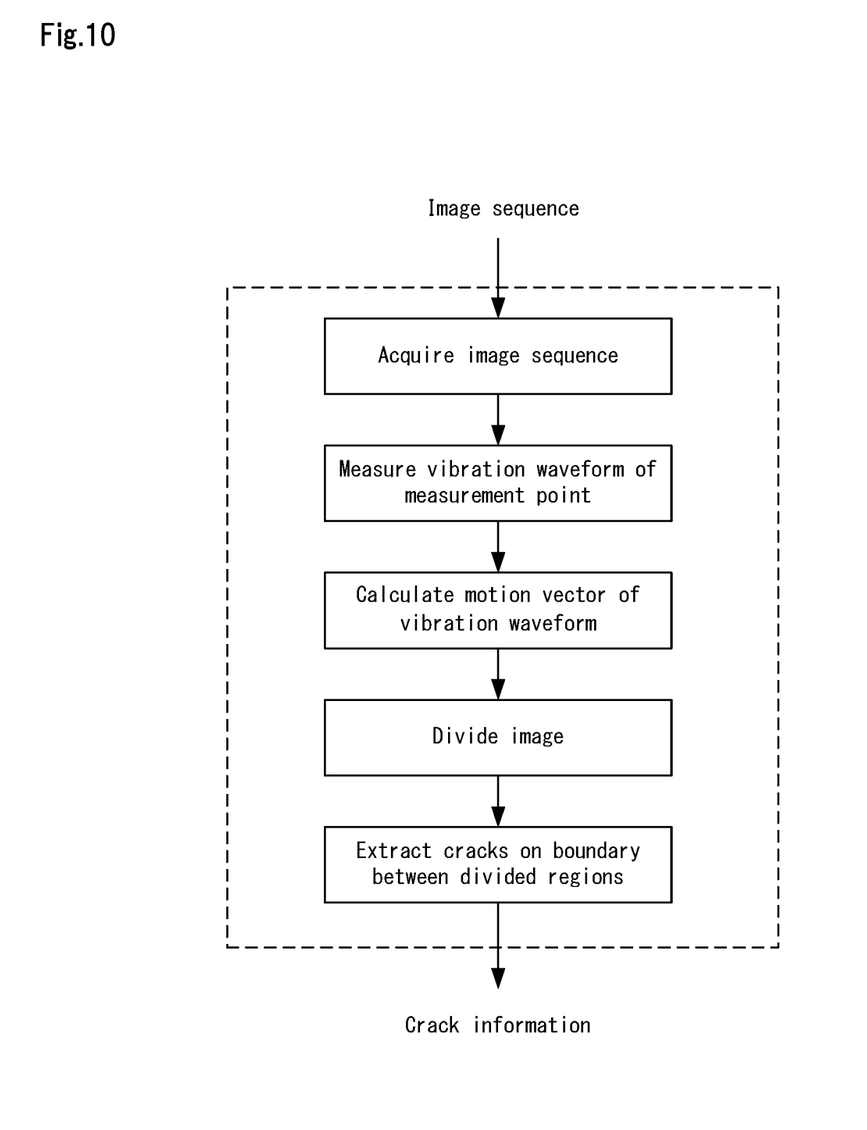
FIG. 10 is a diagram schematically showing processing in a system disclosed in Patent Document 1.

Also, Patent Document 1 proposes a system that detects degradation by using images to measure vibration waveforms at multiple measurement points set on a structure. FIG. 10 is a diagram that schematically shows processing in the system disclosed in Patent Document 1.

As shown in FIG. 10, the system disclosed in Patent Document 1 first acquires an image sequence (moving image) as a query, measures a vibration waveform for each measurement point in the images, and calculates a feature amount, specifically a motion vector, for each of the measured vibration waveforms. Then, based on the calculated motion vectors, the system specifies regions in which the directions of motion are different, and thus divides the images that constitute the image sequence into regions. The system then detects cracks on boundaries between the divided regions.

LIST OF PRIOR ART DOCUMENTS

Patent Document

Patent Document 1: JP 2015-102363A

Non-Patent Document

Non-Patent Document 1: Han Hu; Quanquan Gu; Jie Zhou, "HTF: a novel feature for general crack detection," in Image Processing (ICIP), 2010 17th IEEE International Conference on, vol., no., pp. 1633-1636, 26-29 Sep. 2010 doi: 10.1109/ICIP.2010.5653171

Non-Patent Document 2: Wang Zhen, et. al., "Crack opening displacement estimation method based on sequence of motion vector field images for civil infrastructure deterioration inspection," IMPS 2014, I-1-17

DISCLOSURE OF THE INVENTION

Problems to be Solved by the Invention

However, the systems disclosed in Non-Patent Documents 1 and 2 utilize features in partial images, and are only directed to the detection of visible cracks in the surface of a structure, and therefore such systems are difficult to apply to the detection of degradation inside a structure or the detection of very small cracks.

On the other hand, the method disclosed in Patent Document 1 is capable of detecting even degraded portions inside a structure and very small cracks. However, with the method disclosed in Patent Document 1, there is a problem in that noise is easily generated during detection, and errors easily occur in the classification of a region where a crack is present and a region where a crack is not present.

One example of an object of the present invention is to solve the aforementioned problems, and provide a degradation detection device, a degradation detection method, and a computer-readable recording medium that can precisely detect a degraded portion of a target even if the degraded portion is difficult to see from the outside.

Means for Solving the Problems

A degradation detection device according to one aspect of the present invention includes:

an image acquisition unit that acquires an image sequence of a detection target;

a matching point specification unit that specifies matching points in the image sequence;

a motion amount calculation unit that, based on the specified matching points, for each frame that constitutes the image sequence, specifies motion occurring between the frame and a frame immediately previous thereto, and calculates a motion amount for each of the matching points along a time series; and a degraded region candidate specification unit that specifies a region in which degradation has likely occurred in the image sequence, based on the motion amounts of the matching points that were calculated along the time series.

Also, in order to achieve the aforementioned object, a degradation detection method according to an aspect of the present invention includes:

(a) a step of acquiring an image sequence of a detection target;

(b) a step of specifying matching points in the image sequence;

(c) a step of, based on the specified matching points, for each frame that constitutes the image sequence, specifying motion occurring between the frame and a frame immediately previous thereto, and calculating a motion amount for each of the matching points along a time series; and (d) a step of specifying a region in which degradation has likely occurred in the image sequence, based on the motion amounts of the matching points that were calculated along the time series.

Furthermore, in order to achieve the aforementioned object, a computer-readable recording medium according to an aspect of the present invention has recorded thereon a program including instructions for causing a computer to execute:

(a) a step of acquiring an image sequence of a detection target;

(b) a step of specifying matching points in the image sequence;

(c) a step of, based on the specified matching points, for each frame that constitutes the image sequence, specifying motion occurring between the frame and a frame immediately previous thereto, and calculating a motion amount for each of the matching points along a time series; and (d) a step of specifying a region in which degradation has likely occurred in the image sequence, based on the motion amounts of the matching points that were calculated along the time series.

Advantageous Effects of the Invention

As described above, according to the present invention, it is possible to precisely detect a degraded portion of a target even if the degraded portion is difficult to see from the outside.

MODES FOR CARRYING OUT THE INVENTION

Embodiments

Hereinafter, a degradation detection device, a degradation detection method, and a program according to an embodiment of the present invention will be described with reference to FIGS. 1 to 7.

Apparatus Configuration

Figure 1:
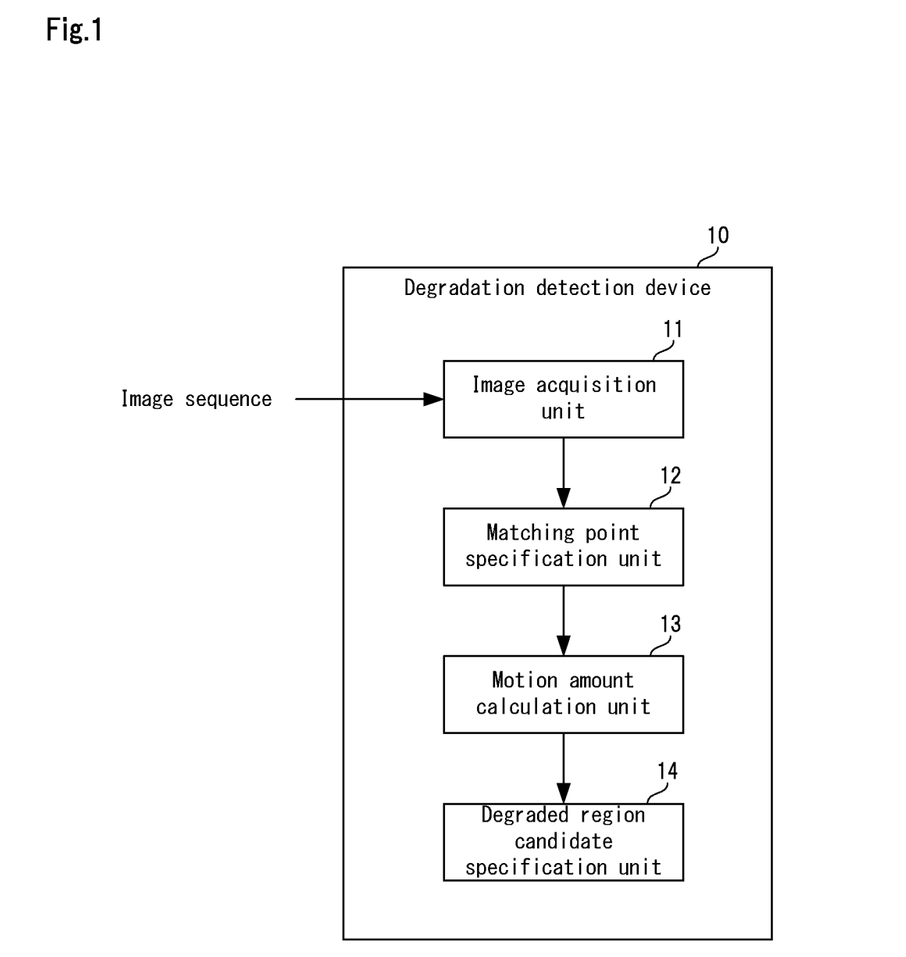
FIG. 1 is a block diagram showing a schematic configuration of a degradation detection device in an embodiment of the present invention.

First, the schematic configuration of the degradation detection device of the present embodiment will be described with reference to FIG. 1. FIG. 1 is a block diagram that shows the schematic configuration of the degradation detection device in the embodiment of the present invention.

A degradation detection device 10 of the present embodiment shown in FIG. 1 is a device for detecting degradation in an infrastructure-related structure or the like that is formed from concrete. As shown in FIG. 1, the degradation detection device 10 includes an image acquisition unit 11, a matching point specification unit 12, a motion amount calculation unit 13, and a degraded region candidate specification unit 14.

The image acquisition unit 11 acquires an image sequence of a detection target. Also, the matching point specification unit 12 specifies matching points in the image sequence acquired by the image acquisition unit 11.

For each of the frames that constitute the image sequence, based on the specified matching points, the motion amount calculation unit 13 specifies motion that occurs between that frame and the immediately previous frame, accordingly calculates a motion amount for each matching point along a time series.

Based on the motion amounts of the matching points that were calculated along the time series, the degraded region candidate specification unit 14 specifies a region in which degradation has likely occurred (hereinafter, called a "degraded region candidate") in the image sequence.

In this way, in the present embodiment, a degraded region candidate is specified based on the motion amounts of specific pixels obtained from an image sequence, and therefore a target degraded portion can be precisely detected even if the degraded portion is difficult to see from the outside.

Figure 2:
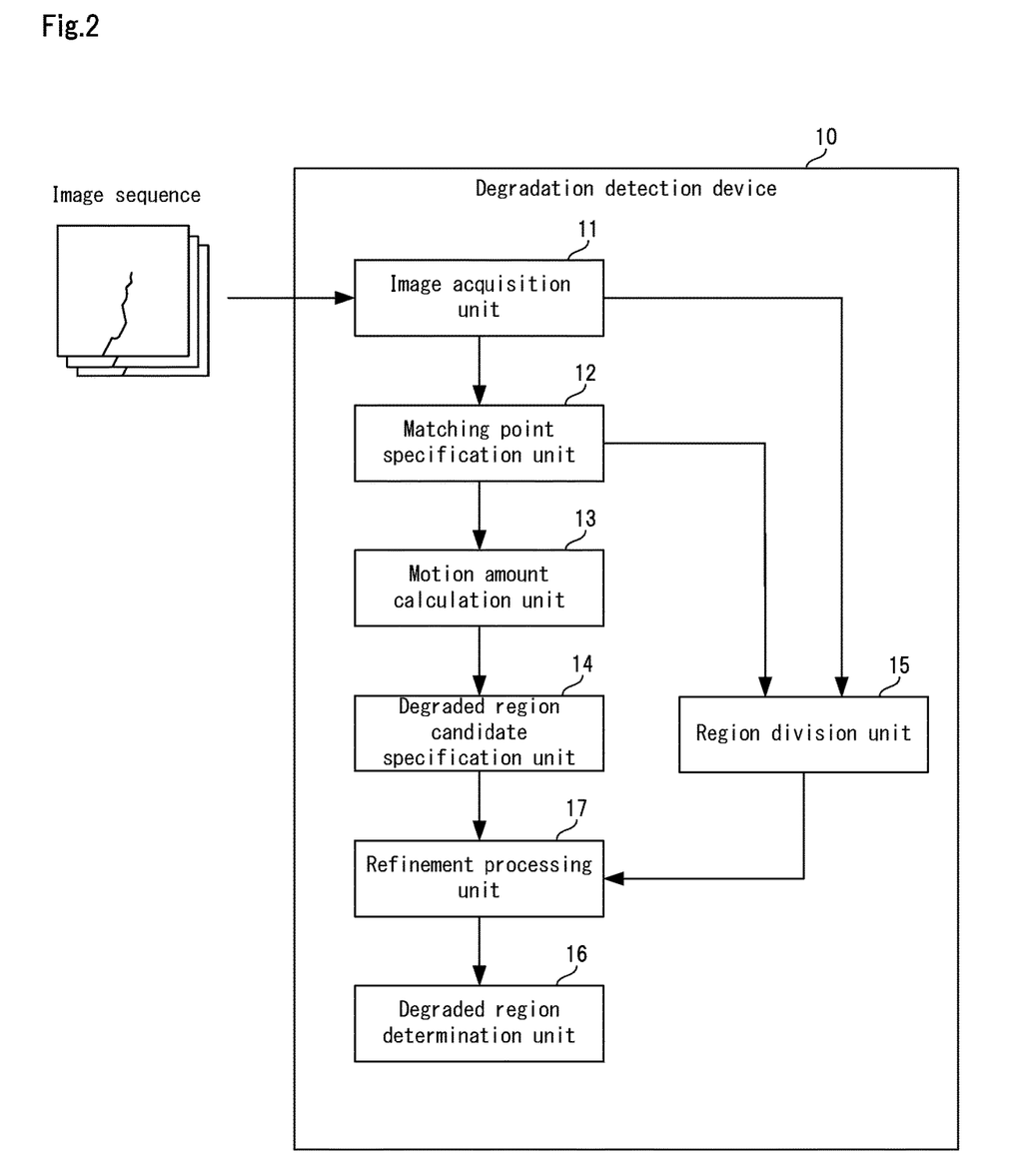
FIG. 2 is a block diagram showing a specific configuration of the degradation detection device in the embodiment of the present invention.

Next, the configuration of the degradation detection device 10 in the present embodiment will be described in more detail with reference to FIGS. 2 to 5. FIG. 2 is a block diagram that shows details of the configuration of the degradation detection device in the embodiment of the present invention.

As shown in FIG. 2, in addition to the image acquisition unit 11, the matching point specification unit 12, the motion amount calculation unit 13, and the degraded region candidate specification unit 14, the degradation detection device 10 in the present embodiment further includes a region division unit 15, a degraded region determination unit 16, and a refinement processing unit 17. The functions of the region division unit the 15, the degraded region determination unit 16, and the refinement processing unit 17 will be described later.

In the present embodiment, the image acquisition unit 11 acquires a detection target image sequence from an image capturing device such as a digital camera or a video camera. The image sequence is a set of pieces of image data that were captured consecutively at a set frame rate. Accordingly, the image acquisition unit 11 acquires pieces of image data in units of frames, and inputs the acquired pieces of image data to the matching point specification unit 12 in the order of acquisition.

In the present embodiment, the matching point specification unit 12 specifies a matching point by comparing feature points in two pieces of image data that are consecutive in the time series. Specifically, upon acquiring a piece of image data from the image sequence, the matching point specification unit 12 first extracts a feature point from the acquired piece of image data. The matching point specification unit 12 then compares the extracted feature point with a feature point that was extracted from the piece of image data that was immediately previously acquired, thus specifying matching points.

In the present embodiment, for each piece of image data (for each frame), the motion amount calculation unit 13 specifies the amount of movement of each matching point from the immediately previous frame, calculates motion amounts for the matching points based on the specified movement amounts, and stores the calculated motion amounts along a time series.

Incidentally, if degradation, such as a crack, appears in the detection target, it is thought that the motion amounts of matching points will fluctuate in the degraded portion due to vibration or the like occurring in the detection target. For this reason, in the present embodiment, the degraded region candidate specification unit 14 specifies degraded region candidates with use of a nonlinear spatio-temporal filter that outputs a higher response value the larger the difference is between the motion amount of a specified point and the motion amounts of surrounding pixels.

Figure 3:
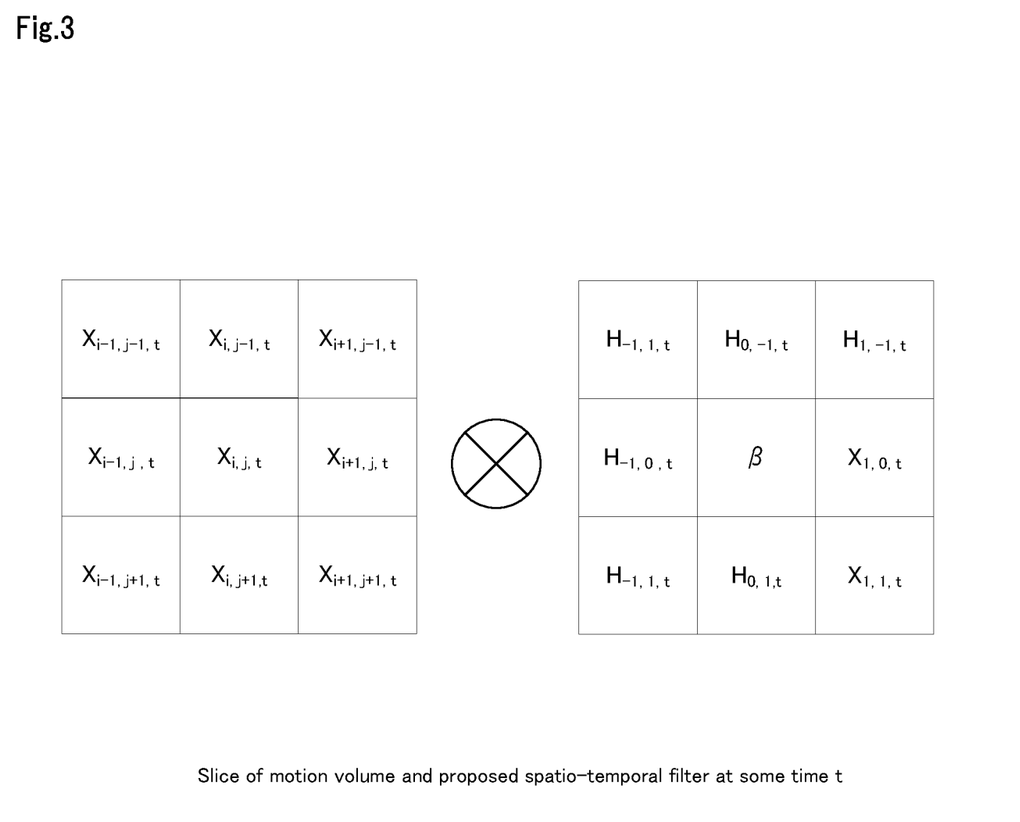
FIG. 3 is a diagram illustrating processing performed by a degraded region candidate specification unit in the embodiment of the present invention.
Figure 4:
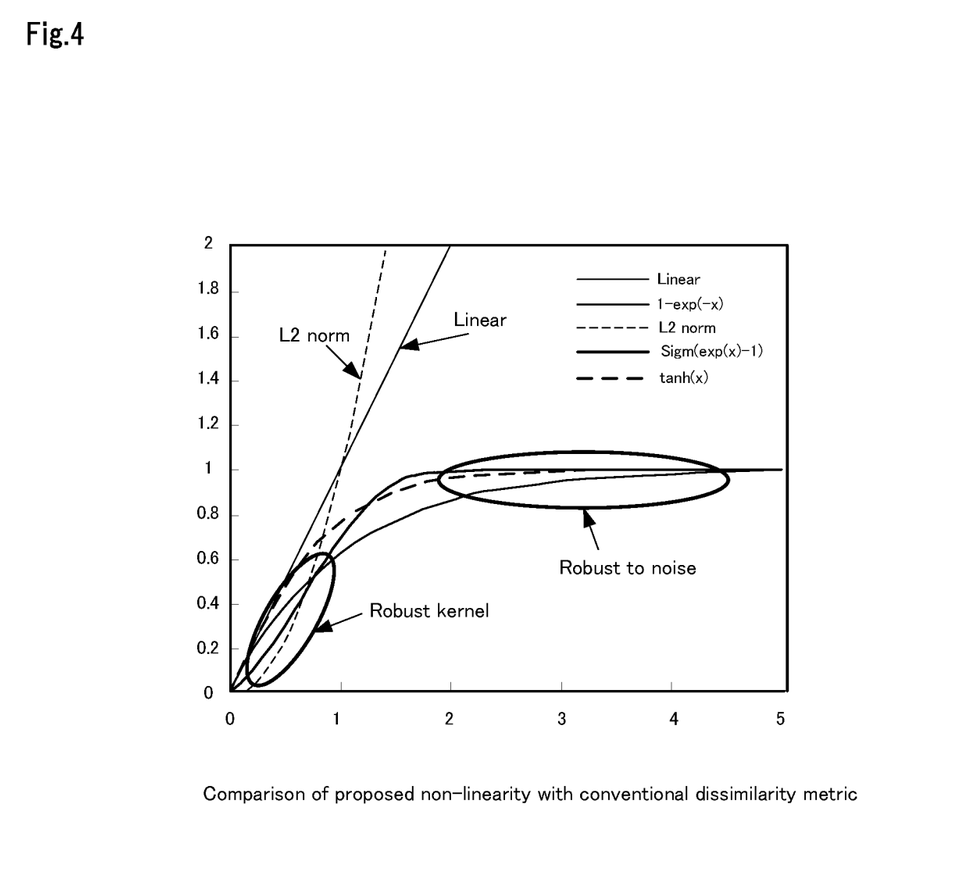
FIG. 4 is a diagram showing characteristics of a nonlinear spatio-temporal filter used in the embodiment of the present invention.

Here, the nonlinear spatio-temporal filter used in the present embodiment will be described with reference to FIGS. 3 and 4. FIG. 3 is a diagram that illustrates processing performed by the degraded region candidate specification unit in this embodiment of the present invention. FIG. 4 is a diagram showing characteristics of the nonlinear spatio-temporal filter used in this embodiment of the present invention.

As shown in FIG. 3, the degraded region candidate specification unit 14 applies a nonlinear spatio-temporal filter H (right side in FIG. 3) to each combination of a motion amount $X_{(i, j, t)}$ of a specified matching point and motion amounts $X_{(i+k, j+l, t)}$ of other matching points that surround the specified matching point.

In FIG. 3, t denotes the time. It should be noted that t is expressed as an integer, and corresponds to numbers given to the frames in accordance with the time series. Also, the time of the first frame is t=0. Letting N be the number of accumulated frames, k and l are set in the range of "−(N−1)/2" to "+(N−1)/2".

Accordingly, the filter shown in Expression 1 below is one example of the nonlinear spatio-temporal filter. The filter shown in Expression 1 below outputs a higher response value $L_{i,j}$ the larger the difference is between the motion amount $X_{(i, j, t)}$ of the specified matching point and the motion amount $X_{(i+k, j+l, t)}$ of a surrounding matching point. The response value $L_{i,j}$ corresponds to the likelihood of degradation. Note that in Expression 1 below, the function f is for calculating the difference between the motion amount $X_{(i, j, t)}$ of the specified matching point and the motion amount $X_{(i+k, j+l, t)}$ of the surrounding matching point.

$$L_{i,j} = \sum_{k} \sum_{l} w_{[k,l]} f\left( \sum_{[i=1,2,...N]} h_{[k,l,t]} |X_{[i+k, j+l, t]} - X_{[i, j, t]}|^n \right)$$ Expression 1

As shown in FIG. 4, in comparison with the case of using a linear filter or a norm filter, the nonlinear spatio-temporal filter suppresses a rise in cost when the target motion amount X increases. Consequently, the nonlinear spatio-temporal filter makes it possible to improve the robustness to noise, thus raising precision in the specification of degraded region candidates.

Also, in the present embodiment, the function f is not limited to the function described above. For example, a redescending M-estimator function, which is one type of robust estimation technique, can also be used as the function f.

Also, the region division unit 15 divides the image sequence into partial regions based on the motion directions of the matching points that were calculated along the time series. Specifically, for each frame, the region division unit 15 specifies a direction of movement of each matching point from the immediately previous frame, and sets the specified movement directions as the directions of motion of the matching points. The region division unit 15 then specifies pairs of matching points that are adjacent and have different motion directions, and divides the frame by connecting the positions between the specified pairs of matching points.

The refinement processing unit 17 performs processing on the degraded region candidates specified by the degraded region candidate specification unit 14 and boundary portions between the partial regions obtained by division performed by the region division unit 15, and removes a degraded region candidate and a boundary portion that do not satisfy a pre-set condition.

Figure 5:
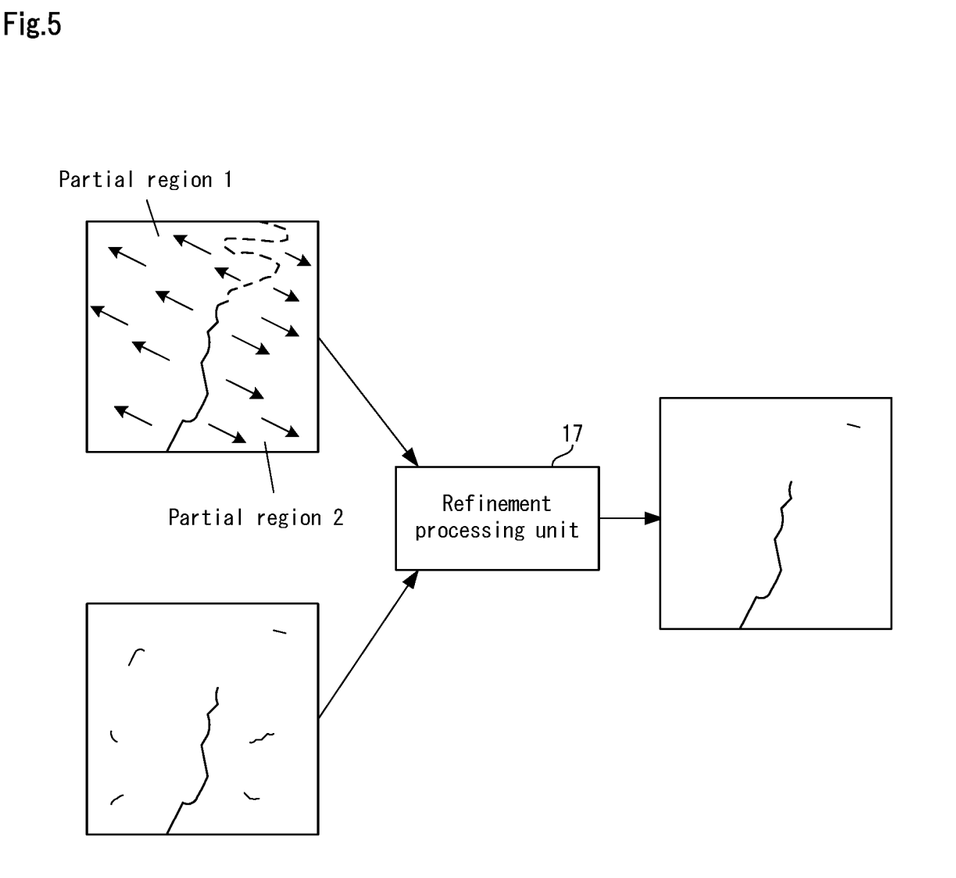
FIG. 5 is a diagram illustrating processing performed by a refinement processing unit in the embodiment of the present invention.

Specifically, as shown in FIG. 5, the refinement processing unit 17 compares a degraded region candidate and a boundary portion between partial regions with crack shapes that have been registered in advance, for example. If the result of the comparison is that the degraded region candidate and the boundary portion between partial regions do not match the crack shapes, the refinement processing unit 17 determines that they are noise and removes them. FIG. 5 is a diagram that illustrates processing performed by the refinement processing unit in this embodiment of the present invention.

Also, the crack shapes used in the comparison may be shapes that are set by an administrator or the like with reference to previous cracks, or may be shapes learned by a machine learning tool. In this way, the refinement processing unit 17 further improves precision in the detection of degraded portions.

Also, in the present embodiment, the processing performed by the refinement processing unit 17 is not limited to the processing described above, and a general noise removal method performed using image processing may be employed as the aforementioned processing. For example, the processing of the refinement processing unit 17 may be performed using a noise removal method that employs prior knowledge regarding the behavior of noise. Specifically, in this noise removal method, a detected crack is compared with prior knowledge, detected cracks that do not match prior knowledge are deemed to be noise and are removed, and detected cracks that match prior knowledge are held as-is. Examples of such noise removal methods performed using image processing are disclosed in Reference Documents 1 and 2 below.

Reference Document 1: J. Mairal, M. Elad and G. Sapiro, "Sparse Representation for Color Image Restoration," in IEEE Transactions on Image Processing, vol. 17, no. 1, pp. 53-69, Jan. 2008.
<http://www.cs.technion.ac.il/~elad/publications/journals/2006/KSVD_Color_IEEE_TIP.pdf>

Reference Document 2: S. Roth and M. J. Black, "Fields of Experts: a framework for learning image priors," 2005 IEEE Computer Society Conference on Computer Vision and Pattern Recognition (CVPR'05), 2005, pp. 860-867 vol. 2.
<http://cs.brown.edu/~roth/pubs/cvpr05roth.pdf>

The degraded region determination unit 16 compares the degraded region candidates specified by the degraded region candidate specification unit 14 with the partial regions obtained by the division performed by the region division unit 15, and based on the comparison results, determines regions in which degradation has occurred (hereinafter, called "degraded regions") in the image sequence.

Specifically, for example, after the processing performed by the refinement processing unit 17, the degraded region determination unit 16 compares the degraded region candidates with the boundary portions between partial regions, and specifies the degraded region candidates that include the boundary portions between partial regions. The degraded region determination unit 16 deems the specified degraded region candidates to be degraded regions.

Device Operation

Figure 6:
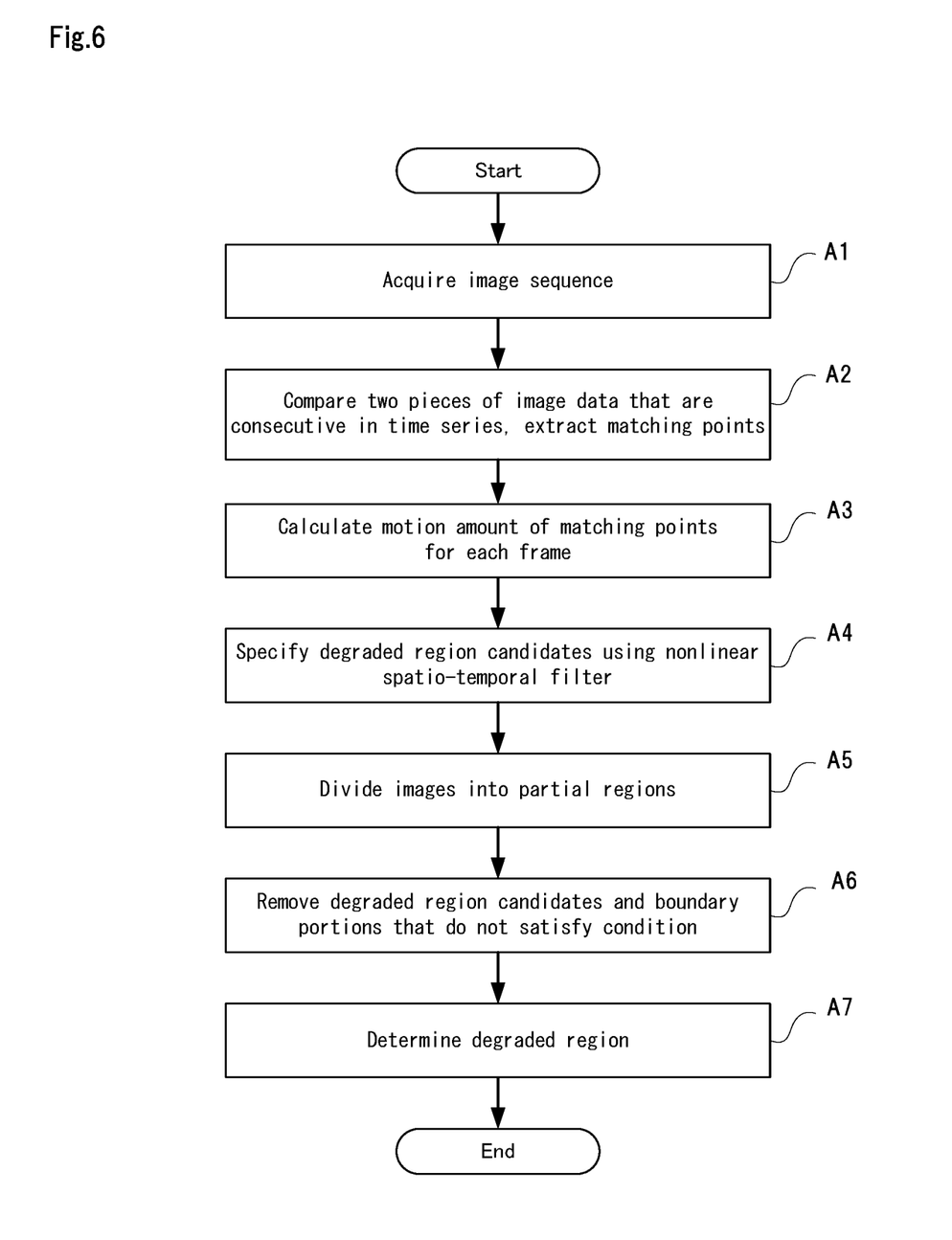
FIG. 6 is a flowchart showing operations of the degradation detection device in the embodiment of the present invention.

Next, operations of the degradation detection device 10 in this embodiment of the present invention will be described with reference to FIG. 6. FIG. 6 is a flowchart showing operations of the degradation detection device in this embodiment of the present invention. FIGS. 1 to 5 are referenced as necessary in the following description. Also, in the present embodiment, the degradation detection method is implemented by causing the degradation detection device 10 to operate. Accordingly, the following description of operation of the degradation detection device 10 will substitute for a description of the degradation detection method of the present embodiment.

As shown in FIG. 6, first, the image acquisition unit 11 acquires an image sequence of a detection target from an external image capturing device (step A1). Specifically, the image acquisition unit 11 sequentially acquires the pieces of image data that are transmitted at a set frame rate, and inputs the acquired pieces of image data to the matching point specification unit 12 in the order of acquisition.

Next, the matching point specification unit 12 compares the feature points of two pieces of image data that are consecutive in the time series, and accordingly specifies matching points in the pieces of image data (step A2). The matching point specification unit 12 then inputs information regarding the specified matching points to the motion amount calculation unit 13.

Next, in the present embodiment, for each frame, the motion amount calculation unit 13 calculates a motion amount for each of the matching points, and stores the calculated motion amount along a time series (step A3).

The degraded region candidate specification unit 14 then acquires the stored motion amounts of matching points, applies a nonlinear spatio-temporal filter to the acquired motion amounts of matching points, and specifies degraded region candidates in the image data (step A4).

Next, the region division unit 15 divides the image sequence into partial regions based on the motion directions of the matching points that were calculated along the time series (step A5). Specifically, the region division unit 15 specifies the motion directions of the matching points, specifies pairs of matching points that are adjacent and have different motion directions, and divides the frames by connecting the positions between the specified pairs of matching points.

Next, the refinement processing unit 17 performs processing on the degraded region candidates specified by the degraded region candidate specification unit 14 and boundary portions between the partial regions obtained by division performed by the region division unit 15, and removes a degraded region candidate and a boundary portion that do not satisfy a pre-set condition (step A6).

Thereafter, the degraded region determination unit 16 compares the degraded region candidates specified in step A4 and the partial regions obtained by division in step A5, and determines a degraded region (step A7).

Effects of Embodiment

In the present embodiment described above, a degraded region of a detection target is specified not based on features appearing in the image, but rather based on the motion amounts of matching points in images. Accordingly, even if very small, poorly visible cracks have appeared, they can be detected precisely.

Also, in the present embodiment, images are divided into regions based on the motion directions of matching points, and a final degraded region is determined with additional reference to boundary portions between the divided regions. Furthermore, in the present embodiment, portions deemed to be noise are also removed. According to the present embodiment, the above effects achieve even further improvements in the precision of detecting degraded regions.

Program

A program according to the present embodiment may be a program for causing a computer to execute steps A1 to A7 shown in FIG. 6. By installing this program in a computer and executing it, it is possible to realize the degradation detection device and the degradation detection method of the present embodiment. In this case, a CPU (Central Processing Unit) of the computer functions as and performs the processing of the image acquisition unit 11, the matching point specification unit 12, the motion amount calculation unit 13, the degraded region candidate specification unit 14, the region division unit 15, the degraded region determination unit 16, and the refinement processing unit 17.

Also, the program of the present embodiment may be executed by a computer system constructed by multiple computers. In this case, for example, the computers may each function as any one of the image acquisition unit 11, the matching point specification unit 12, the motion amount calculation unit 13, the degraded region candidate specification unit 14, the region division unit 15, the degraded region determination unit 16, and the refinement processing unit 17.

Physical Configuration

Figure 7:
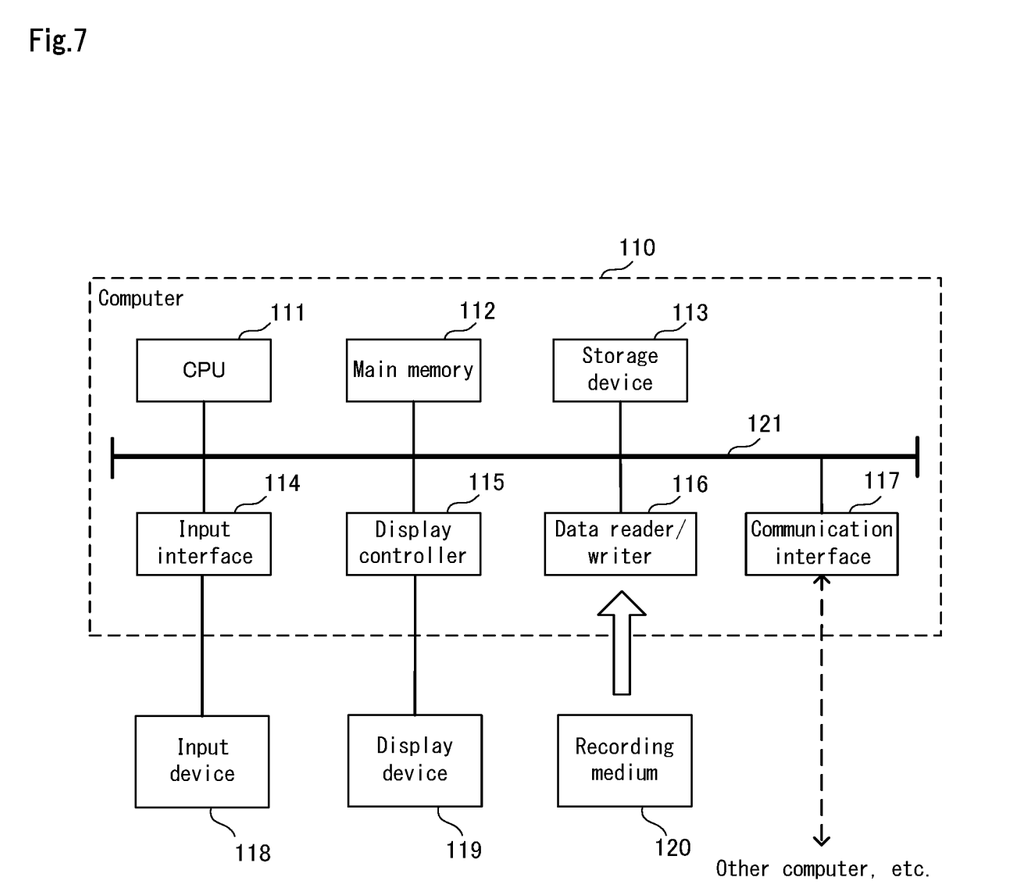
FIG. 7 is a block diagram showing an example of a computer that realizes the degradation detection device in the embodiment of the present invention.

A computer that realizes the degradation detection device 10 by executing the program of the present embodiment will be described below with reference to FIG. 7. FIG. 7 is a block diagram showing an example of the computer that realizes the degradation detection device in this embodiment of the present invention.

As shown in FIG. 7, a computer 110 includes a CPU 111, a main memory 112, a storage device 113, an input interface 114, a display controller 115, a data reader/writer 116, and a communication interface 117. These elements are connected via a bus 121 so as to be able to perform data communication with each other.

The CPU 111 deploys programs (code) of the present embodiment, which are stored in the storage device 113, to the main memory 112, and carries out various types of arithmetic operations by executing the programs in a pre-determined sequence. The main memory 112 is typically a volatile storage device such as a DRAM (Dynamic Random Access Memory). Also, the program of the present embodiment is provided in a state of being stored on a computer-readable recording medium 120. Note that the program of the present embodiment may be distributed over the Internet, which is accessed via the communication interface 117.

Also, specific examples of the storage device 113 include a hard disk drive, as well as a semiconductor storage device such as a flash memory. The input interface 114 mediates the transfer of data between the CPU 111 and an input device 118 such as a keyboard or a mouse. The display controller 115 is connected to a display device 119 and controls the display of screens by the display device 119.

The data reader/writer 116 mediates the transfer of data between the CPU 111 and the recording medium 120, reads out a program from the recording medium 120, and writes processing results obtained by the computer 110 to the recording medium 120. The communication interface 117 mediates the transfer of data between the CPU 111 and another computer.

Also, specific examples of the recording medium 120 include a general-purpose semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory).

Note that instead of being realized by a computer in which a program is installed, the degradation detection device 10 of the present embodiment can also be realized by using hardware corresponding to the various units. Furthermore, a configuration is possible in which a portion of the degradation detection device 10 is realized by a program, and the remaining portion is realized by hardware.

Part or all of the embodiments described above can be realized by Supplementary Notes 1 to 12 described below, but the present invention is not limited to the following descriptions.

Supplementary Note 1

A degradation detection device including:

an image acquisition unit that acquires an image sequence of a detection target;

a matching point specification unit that specifies matching points in the image sequence;

a motion amount calculation unit that, based on the specified matching points, for each frame that constitutes the image sequence, specifies motion occurring between the frame and a frame immediately previous thereto, and calculates a motion amount for each of the matching points along a time series; and a degraded region candidate specification unit that specifies a region in which degradation has likely occurred in the image sequence, based on the motion amounts of the matching points that were calculated along the time series.

Supplementary Note 2

The degradation detection device according to Supplementary Note 1, wherein the degraded region candidate specification unit specifies the region with use of a nonlinear spatio-temporal filter that outputs a higher response value the larger a difference is between a motion amount of a specified point and a motion amount of a surrounding pixel.

Supplementary Note 3

The degradation detection device according to Supplementary Note 1 or 2, further including:

a region division unit that divides the image sequence into a plurality of partial regions based on directions of motion of the matching points calculated along the time series; and a degraded region determination unit that compares the region specified by the degraded region candidate specification unit and the plurality of partial regions obtained by division by the region division unit, and determines a region in which degradation has occurred in the image sequence based on a result of the comparison.

Supplementary Note 4

The degradation detection device according to any of Supplementary Notes 1 to 3, further including:

a refinement processing unit that performs processing on the region specified by the degraded region candidate specification unit and a boundary portion between regions obtained by division by the region division unit, and removes a region or a boundary portion that does not satisfy a pre-set condition.

Supplementary Note 5

A degradation detection method including:

(a) a step of acquiring an image sequence of a detection target;

(b) a step of specifying matching points in the image sequence;

(c) a step of, based on the specified matching points, for each frame that constitutes the image sequence, specifying motion occurring between the frame and a frame immediately previous thereto, and calculating a motion amount for each of the matching points along a time series; and (d) a step of specifying a region in which degradation has likely occurred in the image sequence, based on the motion amounts of the matching points that were calculated along the time series.

Supplementary Note 6

The degradation detection method according to Supplementary Note 5, wherein in the step (d), the region is specified with use of a nonlinear spatio-temporal filter that outputs a higher response value the larger a difference is between a motion amount of a specified point and a motion amount of a surrounding pixel.

Supplementary Note 7

The degradation detection method according to Supplementary Note 5 or 6, further including:

(e) a step of dividing the image sequence into a plurality of partial regions based on directions of motion of the matching points calculated along the time series; and (f) a step of comparing the region specified in the step (d) and the plurality of partial regions obtained by division in the step (e), and determining a region in which degradation has occurred in the image sequence based on a result of the comparison.

Supplementary Note 8

The degradation detection method according to any of Supplementary Notes 5 to 7, further including:

(g) a step of performing processing on the region specified in the step (d) and a boundary portion between regions obtained by division in the step (e), and removing a region or a boundary portion that does not satisfy a pre-set condition.

Supplementary Note 9

A computer-readable recording medium having recorded thereon a program including instructions for causing a computer to execute:

(a) a step of acquiring an image sequence of a detection target;

(b) a step of specifying matching points in the image sequence;

(c) a step of, based on the specified matching points, for each frame that constitutes the image sequence, specifying motion occurring between the frame and a frame immediately previous thereto, and calculating a motion amount for each of the matching points along a time series; and (d) a step of specifying a region in which degradation has likely occurred in the image sequence, based on the motion amounts of the matching points that were calculated along the time series.

Supplementary Note 10

The computer-readable recording medium according to Supplementary Note 9, wherein in the step (d), the region is specified with use of a nonlinear spatio-temporal filter that outputs a higher response value the larger a difference is between a motion amount of a specified point and a motion amount of a surrounding pixel.

Supplementary Note 11

The computer-readable recording medium according to Supplementary Note 9 or 10, wherein the program further includes instructions for causing the computer to execute:

(e) a step of dividing the image sequence into a plurality of partial regions based on directions of motion of the matching points calculated along the time series; and (f) a step of comparing the region specified in the step (d) and the plurality of partial regions obtained by division in the step (e), and determining a region in which degradation has occurred in the image sequence based on a result of the comparison.

Supplementary Note 12

The computer-readable recording medium according to any of Supplementary Notes 9 to 11, wherein the program further includes instructions for causing the computer to execute:

(g) a step of performing processing on the region specified in the step (d) and a boundary portion between regions obtained by division in the step (e), and removing a region or a boundary portion that does not satisfy a pre-set condition.

Although the present invention has been described with reference to embodiments above, the present invention is not limited to the above embodiments. Various modifications understandable to a person skilled in the art can be made to the configuration and details of the present invention within the scope of the present invention.

INDUSTRIAL APPLICABILITY

As described above, according to the present invention, it is possible to precisely detect a degraded portion of a target even if the degraded portion is difficult to see from the outside. The present invention is useful in fields that require the detection of degradation in infrastructure-related structures such as tunnels and bridges.

LIST OF REFERENCE SIGNS

10 Degradation detection device
11 Image acquisition unit
12 Matching point specification unit
13 Motion amount calculation unit
14 Degraded region candidate specification unit
15 Region division unit
16 Degraded region determination unit
17 Refinement processing unit
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A degradation detection device comprising:
an image acquisition unit that acquires an image sequence of a detection target;
a matching point specification unit that specifies matching points in the image sequence;
a motion amount calculation unit that, based on the specified matching points, for each frame that constitutes the image sequence, specifies motion occurring between the frame and a frame immediately previous thereto, and calculates a motion amount for each of the matching points along a time series;
a degraded region candidate specification unit that specifies a region in which degradation has likely occurred in the image sequence, based on the motion amounts of the matching points that were calculated along the time series;
a refinement processing unit that performs processing on the region specified by the degraded region candidate specification unit and boundary portions between regions obtained by division by the region division unit, and removes a region or a boundary portion that does not satisfy a pre-set condition; and
a region division unit that divides the image sequence into a plurality of partial regions;
wherein the refinement processing unit determines whether the region specified by the degraded region candidate specification unit and boundary portions between partial regions of the plurality of partial regions are noise by comparing the region specified by the degraded region candidate specification unit and the boundary portions between the partial regions of the plurality of partial regions with crack shapes that have been registered in advance;
wherein, when the refinement processing unit determines that the region specified by the degraded region candidate specification unit and the boundary portions between the partial regions of the plurality of partial regions do not match the crack shapes that have been registered in advance, the refinement processing unit determines that the region specified by the degraded region candidate specification unit and the boundary portions between the partial regions of the plurality of partial regions are noise and removes the region specified by the degraded region candidate specification unit and the boundary portions between the partial regions of the plurality of partial regions wherein the region division unit divides the image sequence into the plurality of partial regions based on directions of motion of the matching points calculated along the time series;

wherein the degradation detection device further comprises a degraded region determination unit that compares the region specified by the degraded region candidate specification unit and the plurality of partial regions obtained by division by the region division unit, and determines a region in which degradation has occurred in the image sequence based on a result of the comparison;

wherein the degraded region determination unit compares the region specified by the degraded region candidate specification unit with the boundary portions between the partial regions of the plurality of partial regions, after the refinement processing unit performs the processing, and specifies degraded region candidates that include the boundary portions between the partial regions of the plurality of partial regions; and wherein the degraded region determination unit deems the specified degraded region candidates to be degraded regions.

2. The degradation detection device according to claim 1, wherein the degraded region candidate specification unit specifies the region with use of a nonlinear spatiotemporal filter that outputs a higher response value the larger a difference is between a motion amount of a specified point and a motion amount of a surrounding pixel.

3. A degradation method comprising:

acquiring an image sequence of a detection target;

specifying matching points in the image sequence;

based on the specified matching points, for each frame that constitutes the image sequence, specifying motion occurring between the frame and a frame immediately previous thereto, and calculating a motion amount for each of the matching points along a time series;

specifying a region in which degradation has likely occurred in the image sequence, based on the motion amounts of the matching points that were calculated along the time series dividing the image sequence into a plurality of partial regions;

performing processing on the region specified in which degradation has likely occurred and boundary portions between regions obtained by the division, and removing a region or a boundary portion that does not satisfy a pre-set condition;

determining whether the region specified in which degradation has likely occurred and a boundary portions between partial regions of the plurality of partial regions are noise by comparing the region specified in which degradation has likely occurred and the boundary portions between the partial regions of the plurality of partial regions with crack shapes that have been registered in advance;

determining that the region specified in which degradation has likely occurred and the boundary portions between the partial regions of the plurality of partial regions are noise when the region specified in which degradation has likely occurred and the boundary portions between the partial regions of the plurality of partial regions match the crack shapes that have been registered in advance; and removing the region specified in which degradation has likely occurred and the boundary portions between the partial regions of the plurality of partial regions when the region specified in which degradation has likely occurred and the boundary portions between the partial regions of the plurality of partial regions match the crack shapes that have been registered in advance;

wherein the division of the image sequence into the plurality of partial regions is performed based on directions of motion of the matching points calculated along the time series;

wherein the degradation detection method further comprises comparing the region specified in which degradation has likely occurred and the plurality of partial regions obtained by the division, and determining a region in which degradation has occurred in the image sequence based on a result of the comparison;

wherein the degradation detection method further comprises comparing the region specified in which degradation has likely occurred with the boundary portions between the partial regions of the plurality of partial regions, after performing the processing, and specifying degraded region candidates that include the boundary portions between the partial regions of the plurality of partial regions; and wherein the degradation detection method further comprises deeming the specified degraded region candidates as degraded regions.

4. The degradation detection method according to claim 3, wherein in the specification of the region in which degradation has likely occurred in the image sequence, the region is specified with use of a nonlinear spatiotemporal filter that outputs a higher response value the larger a difference is between a motion amount of a specified point and a motion amount of a surrounding pixel.

5. A non-transitory computer-readable recording medium having recorded thereon a program including instructions for causing a computer to execute:

acquiring an image sequence of a detection target;

specifying matching points in the image sequence;

based on the specified matching points, for each frame that constitutes the image sequence, specifying motion occurring between the frame and a frame immediately previous thereto, and calculating a motion amount for each of the matching points along a time series;

specifying a region in which degradation has likely occurred in the image sequence, based on the motion amounts of the matching points that were calculated along the time series;

dividing the image sequence into a plurality of partial regions;

performing processing on the region specified in which degradation has likely occurred and boundary portions between regions obtained by the division, and removing a region or a boundary portion that does not satisfy a pre-set condition;

determining whether the region specified in which degradation has likely occurred and a boundary portions between partial regions of the plurality of partial regions are noise by comparing the region specified in which degradation has likely occurred and the boundary portions between the partial regions of the plurality of partial regions with crack shapes that have been registered in advance;

determining that the region specified in which degradation has likely occurred and the boundary portions between the partial regions of the plurality of partial regions are noise when the region specified in which degradation has likely occurred and the boundary portions between the partial regions of the plurality of partial regions match the crack shapes that have been registered in advance; and removing the region specified in which degradation has likely occurred and the boundary portions between the partial regions of the plurality of partial regions when the region specified in which degradation has likely occurred and the boundary portions between the partial regions of the plurality of partial regions match the crack shapes that have been registered in advance;

wherein the division of the image sequence into the plurality of partial regions is performed based on directions of motion of the matching points calculated along the time series;

wherein the program further includes instructions for causing the computer to execute comparing the region specified in which degradation has likely occurred and the plurality of partial regions obtained by the division, and determining a region in which degradation has occurred in the image sequence based on a result of the comparison;

wherein the program further includes instructions for causing the computer to execute comparing the region specified in which degradation has likely occurred with the boundary portions between the partial regions of the plurality of partial regions, after performing the processing, and specifying degraded region candidates that include the boundary portions between the partial regions of the plurality of partial regions; and wherein the program further includes instructions for causing the computer to execute deeming the specified degraded region candidates as degraded regions.

6. The non-transitory computer-readable recording medium according to claim 5, wherein in the specification of the region in which degradation has likely occurred in the image sequence, the region is specified with use of a nonlinear spatio-temporal filter that outputs a higher response value the larger a difference is between a motion amount of a specified point and a motion amount of a surrounding pixel.

* * * * *